US010869066B2

(12) United States Patent
Anderson

(10) Patent No.: US 10,869,066 B2
(45) Date of Patent: Dec. 15, 2020

(54) MEDIA CONTENT DELIVERY SYSTEM

(71) Applicant: Intel Corporation, Santa Clara, CA (US)

(72) Inventor: Glen J. Anderson, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 71 days.

(21) Appl. No.: 15/936,506

(22) Filed: Mar. 27, 2018

(65) Prior Publication Data

US 2019/0052914 A1 Feb. 14, 2019

(51) Int. Cl.
G06F 15/16 (2006.01)
H04N 21/214 (2011.01)
H04N 21/647 (2011.01)
H04N 21/24 (2011.01)
H04N 21/262 (2011.01)
H04N 21/45 (2011.01)
H04N 21/2543 (2011.01)
H04N 21/238 (2011.01)
H04N 21/231 (2011.01)
H04N 21/258 (2011.01)
H04N 21/2225 (2011.01)

(52) U.S. Cl.
CPC ....... H04N 21/214 (2013.01); H04N 21/2225 (2013.01); H04N 21/238 (2013.01); H04N 21/23116 (2013.01); H04N 21/2402 (2013.01); H04N 21/2408 (2013.01); H04N 21/2543 (2013.01); H04N 21/25841 (2013.01); H04N 21/25891 (2013.01); H04N 21/26208 (2013.01); H04N 21/4532 (2013.01); H04N 21/64761 (2013.01)

(58) Field of Classification Search
CPC .. H04N 21/214; H04N 45/00; H04N 21/2225; H04N 21/23116; H04N 21/238; H04N 21/2402; H04N 21/2408; H04N 21/2543; H04N 21/25841; H04N 21/25891; H04N 21/26208; H04N 21/4532; H04N 21/64761
USPC .......................................... 709/219
See application file for complete search history.

(56) References Cited

U.S. PATENT DOCUMENTS

| 2005/0174974 A1* | 8/2005 | Sonntag ................ H04W 92/20 370/338 |
| 2009/0128324 A1* | 5/2009 | Kim .................. G08G 1/096791 340/539.2 |
| 2009/0212168 A1* | 8/2009 | Kumar ................ B61L 27/0088 246/167 R |
| 2013/0322245 A1* | 12/2013 | Seo .................. H04W 28/0247 370/235 |
| 2016/0204978 A1 | 7/2016 | Anderson et al. |

(Continued)

Primary Examiner — Suraj M Joshi
Assistant Examiner — Ayele F. Woldemariam
(74) Attorney, Agent, or Firm — Viering, Jentschura & Partner MBB

(57) ABSTRACT

Herein is disclosed a media content delivery device, comprising one or more content demand processors, configured to determine a first location, the first location being a location for media content receipt; determine a second location, the second being a location for media content delivery; one or more vehicle coordination processors, configured to select a vehicle for media content transportation; cause the vehicle to wirelessly receive the media content at the first location; and cause the vehicle to deliver the media content at the second location.

17 Claims, 9 Drawing Sheets

(56) References Cited

U.S. PATENT DOCUMENTS

2016/0323356 A1* 11/2016 Ribeiro .................. H04L 67/06
2017/0311228 A1* 10/2017 Zavesky ............... H04W 48/04
2018/0143027 A1*  5/2018 Schlesinger ......... G01C 21/343
2018/0167789 A1*  6/2018 Tsuchida ................ G06F 13/00

* cited by examiner

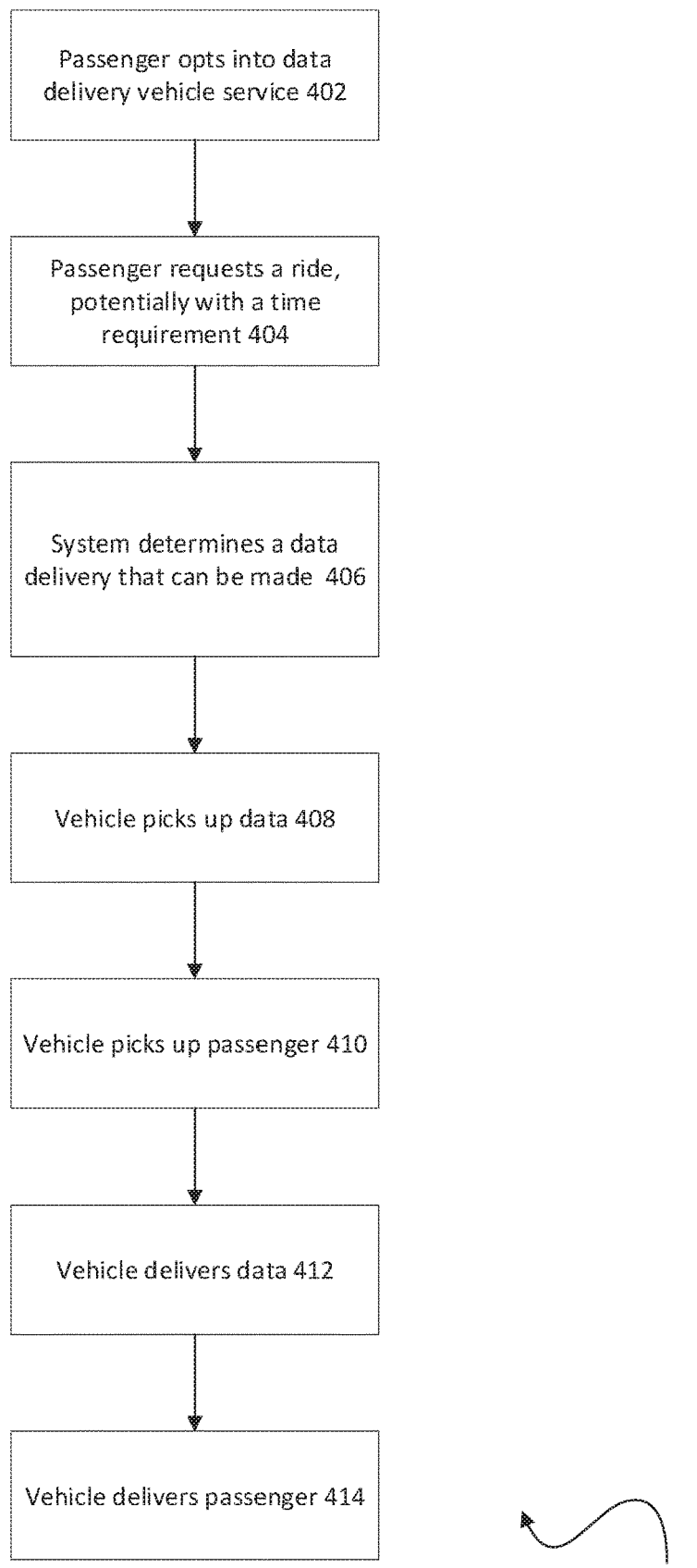
Fig. 4

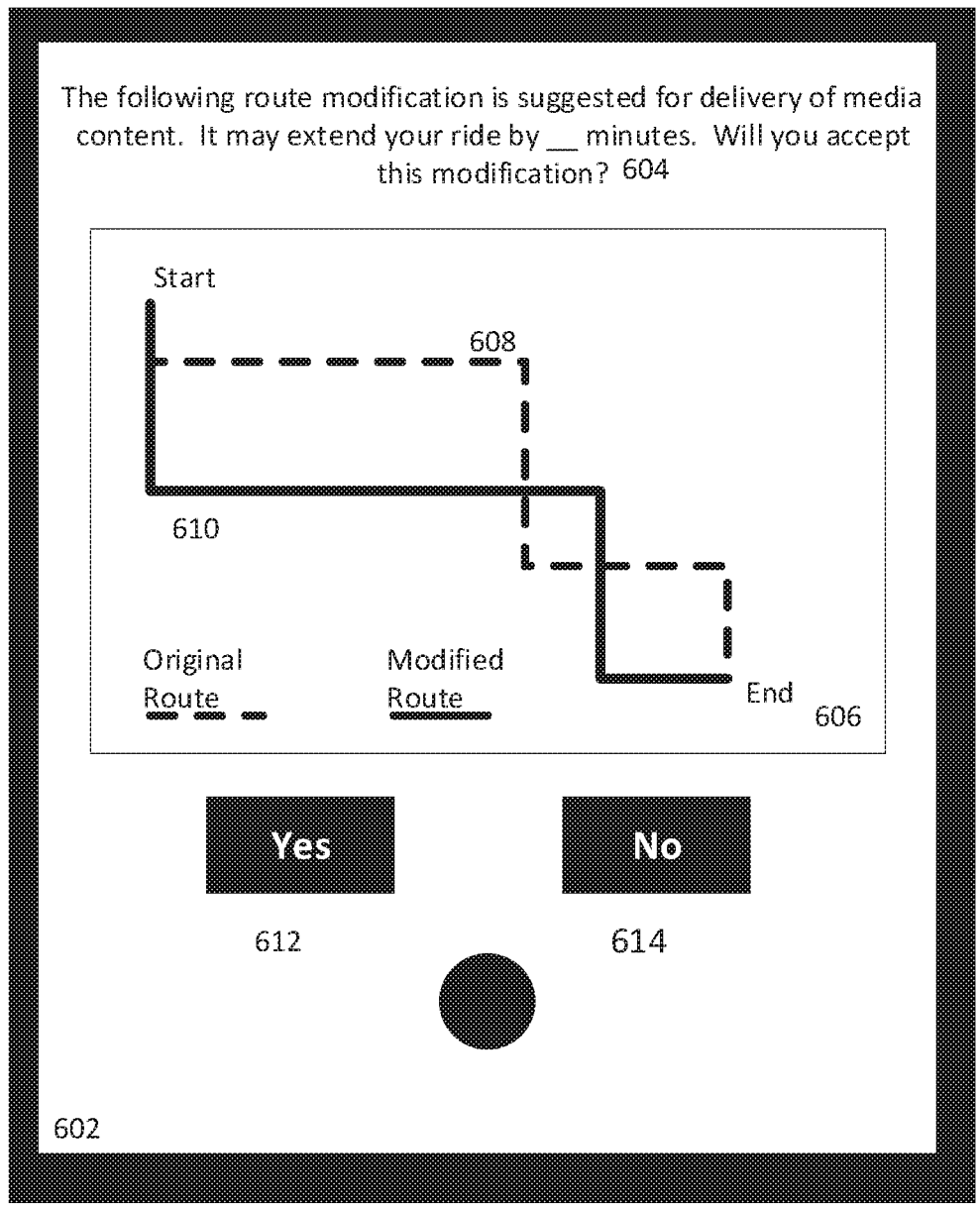
Fig. 6

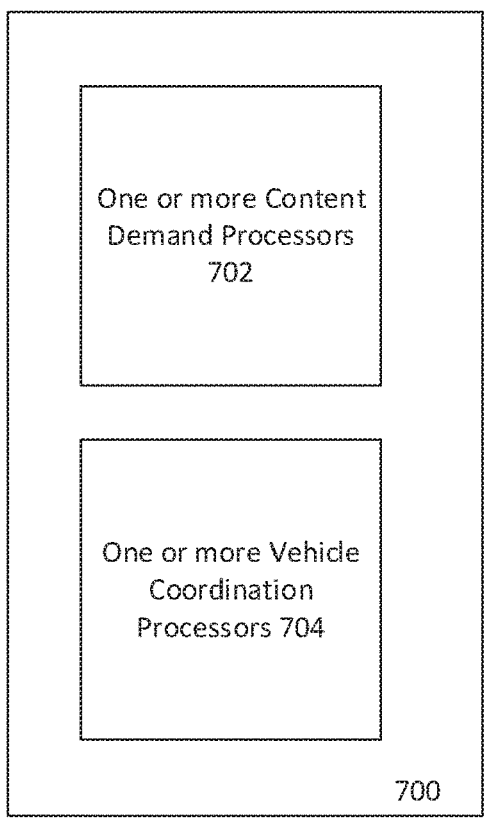
Fig. 7
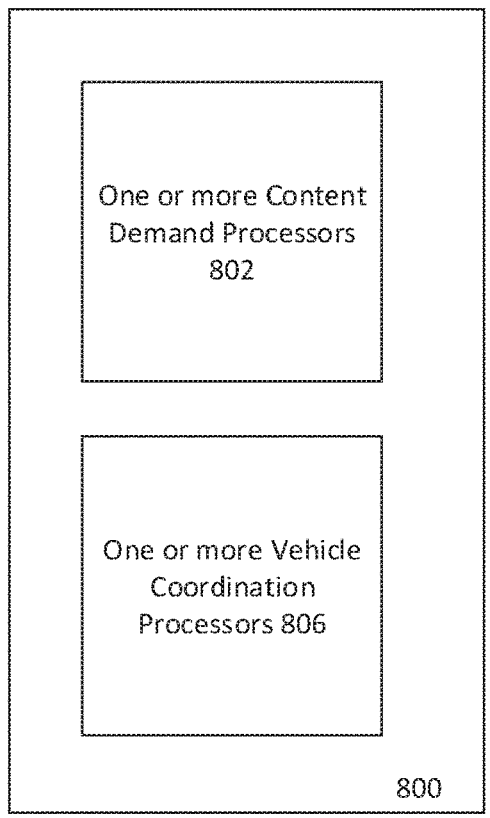
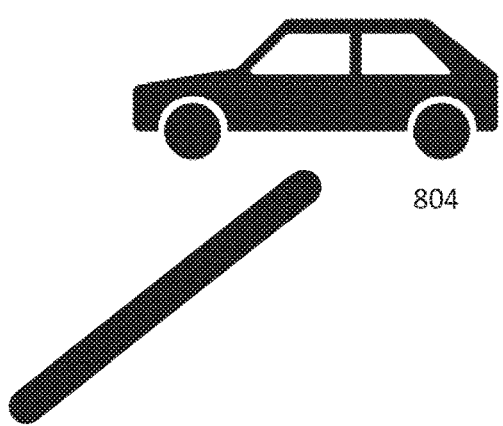
Fig. 8

MEDIA CONTENT DELIVERY SYSTEM

TECHNICAL FIELD

Various aspects of the disclosure relate generally to the coordination of a mobile edge computing system with a vehicle fleet system to deliver media content.

BACKGROUND

Demands for bandwidth are ever-increasing. In recent years, streaming video has placed great demand on the available bandwidth, and video's demands on bandwidth are expected to continue to increase. For example, as interest in 4K definition video increases, a considerable burden will likely be placed on existing bandwidth, and the existing bandwidth structure may be insufficient to deliver sufficient data to meet the traffic demands. Mobile Edge Computing ("MEC") has been offered as a means to reduce problems associated with inadequate bandwidth. MEC may benefit from more efficient delivery of media content using a method that eases a burden on the existing bandwidth availability.

SUMMARY

Herein is disclosed a media content delivery device, comprising one or more content demand processors, configured to determine a first location, the first location being a location for media content receipt; determine a second location, the second being a location for media content delivery; one or more vehicle coordination processors, configured to select a vehicle for media content transportation; cause the vehicle to wirelessly receive the media content at the first location; and cause the vehicle to deliver the media content at the second location.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 4 shows a flowchart for passenger participation in media content delivery;

FIG. 6 shows a user notification panel for a route modification;

FIG. 7 shows a media content delivery device;

FIG. 8 shows a second method for media content delivery system;

DESCRIPTION

Figure 1:
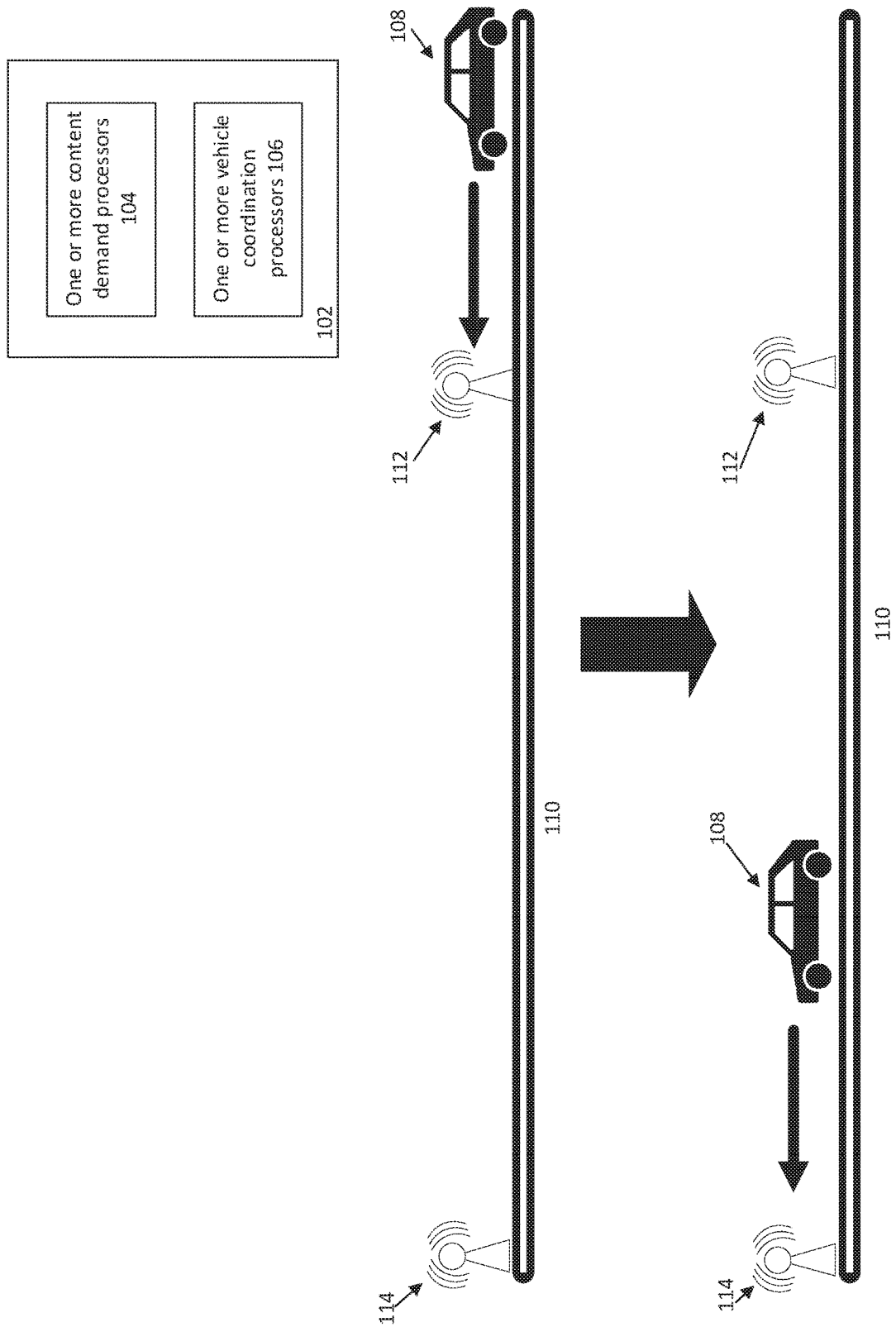
FIG. 1 shows a selected vehicle receiving and delivering data content.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit ("ASIC"), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

Streaming data requires significant bandwidth resources. As data demand increases, the demand for data may actually exceed the available bandwidth resources. Moreover, newer streaming data technologies, such as 4K video, require significantly greater bandwidth than conventional streaming technologies, which places strain on the existing bandwidth resources. Particular strain may be placed on the resources toward the edge of a network. This increased demand, coupled with increased data requirements, necessitate the ability to improve data delivery methods, particularly on the network's edge.

Where it is required to improve transmission of data, such as, for example, from a central location to the edge of a network, it may be desirable to implement alternative data transmission strategies. Once such alternative delivery strategy is to harness existing physical transportation networks for delivery of media content.

For example, many areas have an established taxi system, which makes available vehicles to transport people from a point of origin to a point of destination. Many such taxis now operate, whether wholly or in part, using a computerized scheduling system. Moreover, in recent years, many transportation systems have become established, whereby a rider may summon a vehicle from a mobile device by issuing a ride request, and a centralized server pairs the rider with a vehicle. Various permutations of the system are also available, such as a ridesharing system that permits multiple independent riders to be matched together for a ride.

In addition, it is anticipated that autonomous vehicles will become more commonplace in the coming years, said autonomous vehicles likely being used for passenger transportation from a point of origin to a point of destination. It is anticipated that users may be able to summon one or more autonomous vehicles from a mobile device, and that one or more autonomous vehicles may be controlled, at least in part, by a centralized processor that matches vehicles and passengers. Furthermore, it is anticipated that manned vehicles and/or unmanned or autonomous vehicles may have periods of low ridership, where they may be free to engage in passengerless travel for transportation of media content.

In light of the need for additional or improved transmission of media data, particularly to a network edge, and the increasing availability of vehicles for ridesharing and other transportation endeavors, it is desired to utilize vehicle traffic to transport media data for use with mobile edge computing technology.

FIG. 1 shows a simplified depiction of vehicle transfer of media data. Vehicles and media data are coordinated by one or more central processors 102 comprising at least one or more content demand processors 104 and one or more vehicle coordination processors 106. A vehicle 108, whether an independent vehicle or a member of a fleet of vehicles, is matched to media content. The vehicle 108 is provided with a route 110, which causes the vehicle to come within a proximity of a station for receipt of the media data and a location for delivery of the media data. The media content is made available to the vehicle 108 at a media content node 112, where the media content is transmitted from the media node 112 to the vehicle 108. The transmission may occur wirelessly or via a wired connection. Upon receiving the media, the vehicle 108 travels to a media delivery point 114. At the delivery point 114, the vehicle 108 delivers the media content for additional use. Upon delivery, the media content becomes available for a media content device, such as, but not limited to, an MEC device, a base station, or an end user device. The upper portion of FIG. 1 depicts the vehicle 108 traveling toward the media node 112 for receipt of the media content. The lower portion of FIG. 1 shows the vehicle 108, already having received the media content from the media node 112, traveling to the delivery point 114.

Figure 2:
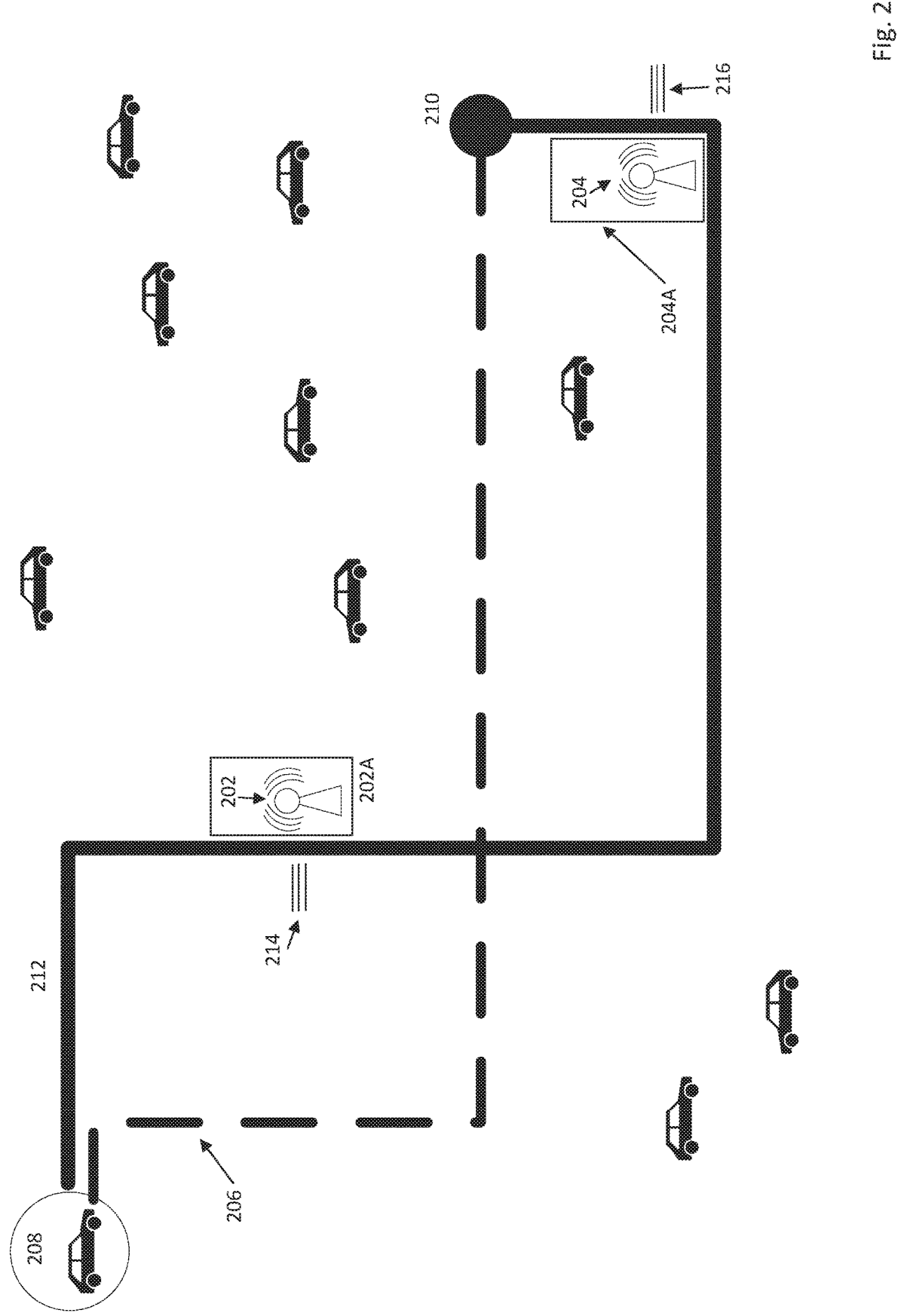
FIG. 2 shows a modification of a vehicle route.

FIG. 2 shows a modification of a planned vehicle route to accommodate data transfer. In this figure, a node for receipt of media content 202 is located at a first location 202A and a node for delivery of media content 204 is located at a second location 204A. A first route 206 may have previously been selected by a transportation network (such as, but not limited to, a taxi network, a ridesharing network, or otherwise) for a vehicle to travel from a starting location 208 to an ending location 210. This route 206 may be chosen according to any standard, including, but not limited to, shortest duration, shortest distance, least traffic, or closest relation to other passengers.

Using any of the methods described herein, the system may designate a second location 204A as a location for delivery of media content. Where media content is scheduled for delivery, a media content delivery request is issued. The system may then assess one or more vehicles to match a media content delivery request with a vehicle. Delivery of media content requires picking up or receiving media content 214 from a media content node 202 at the first location 202A and delivering the media content 216 to a media content node 204 at the second location 204A. The selected vehicle may be at least a vehicle that is otherwise unoccupied, a vehicle that is currently engaged in transportation, or a vehicle that is scheduled to engage in transportation. Where the vehicle is currently engaged in transportation or is scheduled to be engaged in transportation, the vehicle may have an assigned route 206 to a destination 210. The assigned route 206 may not correspond with one or both of the first location 202A for receipt of the media content or the second location 204A for delivery of the media content. As such, the vehicle's route may be altered, such that the vehicle comes within a proximity of the nodes corresponding to the first location 202A and the second location 204A.

In FIG. 2, the scheduled route 206 is changed to a modified route 212, said modified route 212 causing the vehicle to travel within a proximity of the first location 202A and the second location 204A. During the modified route 212, the vehicle travels to the first location 202A to where it is within a proximity of a corresponding media node. The median node at the first location 202A transfers media content from the node to the vehicle. The media content is stored within a media content storage device located on or in the vehicle, or within the vehicle itself. This stored media content is then transported, via the vehicle, from the first location 202A to the second location 204A. At the second location 204A, the vehicle is within a proximity of the corresponding node, and the stored media content in or on the vehicle is transmitted to the corresponding node. Alternatively, the stored media content may be stored in a device that may be separate from the vehicle, such that the device can be left within the vicinity of the second location 204A. Using these operations, the media content becomes available at the second location 204A, and thereby within a region surrounding the second location 204A, without requiring bandwidth for transmission between the node at the first location 202A and the second location 204A.

Figure 3:
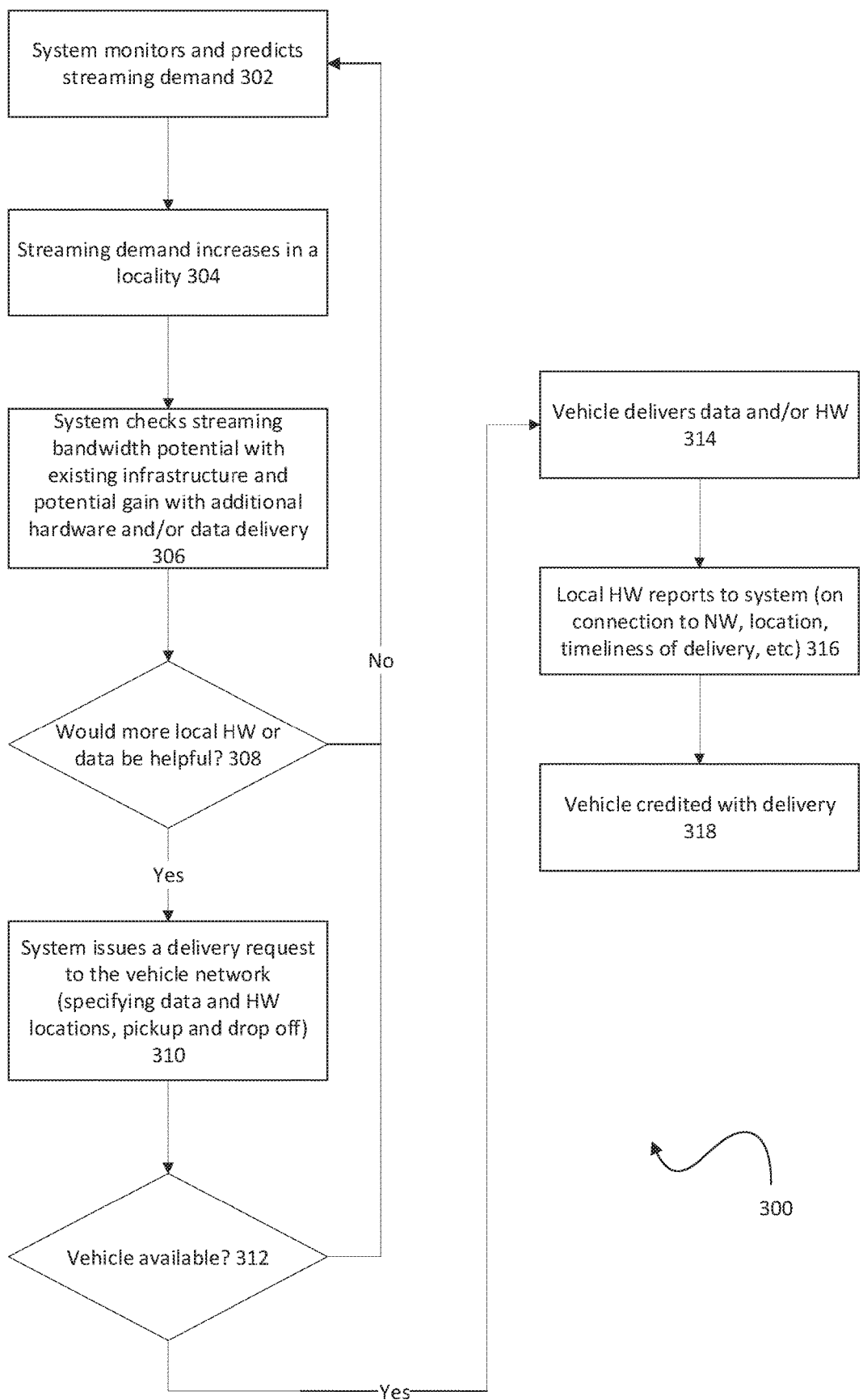
FIG. 3 shows a flowchart for delivery of media content.

FIG. 3 shows a procedure for mobile content delivery 300. According to this procedure, the system may begin by monitoring and predicting streaming demand 302. This can be performed using any data available to the system including, but not limited to, historical data usage, bandwidth availability, prospective release of new data, planned media use, or any combination of the foregoing. The system may identify increases in streaming demand within a given locality 304. The system may check streaming bandwidth potential with existing infrastructure and potential gain with additional hardware and/or data delivery 306. Using any combination of the above factors, the system may decide whether additional local hardware or data would assist in media content delivery 308. Where no additional local hardware or data would be useful, the system may resume evaluation of data prediction and needs. Where additional local hardware or data would be helpful, the system issues a delivery request to a vehicle network, wherein the system specifies data and hardware locations, such as pickup and drop-off points for the data 310. The system then determines whether a vehicle is available for delivery of the requested data 312. Where a vehicle is not available, the system may resume evaluation of data prediction and needs ("no" arrow to 302). Where a vehicle is available, the system causes the vehicle to deliver the data and/or hardware 314. The local hardware reports to the system regarding connection to the network, location, and/or timeliness of delivery, etc. 316. Upon successful completion of the delivery, the vehicle may be credited with delivery of the media content 318.

It is anticipated that the vehicle to deliver media content may be a passenger vehicle, such as a taxi, a ridesharing vehicle, an autonomous vehicle with the passenger, or any other kind of transportation vehicle that carries a passenger from a point of origin to a point of destination. FIG. 4 depicts delivery of media content using a passenger-occupied vehicle 400. In this system, the passenger grants permission for, or ops into, a data delivery vehicle service 402. The passenger requests a ride, the ride potentially having a time requirement, such as a maximum permissible time 404. The system determines a data delivery that can be made using the vehicle in which the passenger is riding 406. This decision may take into account a time requirement, a relationship between a vehicle route and the first location and/or second location, traffic data, congestion data, or otherwise. Assuming that the data delivery is possible, the vehicle travels to a media content node to receive the media content data (picks up the data) 408, which may occur before or during the ride. In the event that the media content receipt has occurred before receiving a passenger, the vehicle may travel to a point of origin to pick up the passenger 410. The vehicle travels to a media content node for delivery of the media content and delivers the data, whether before delivering the passenger or after delivering the passenger 412. The vehicle delivers the passenger, whether before delivering the data or after delivering the data 414.

Figure 5:
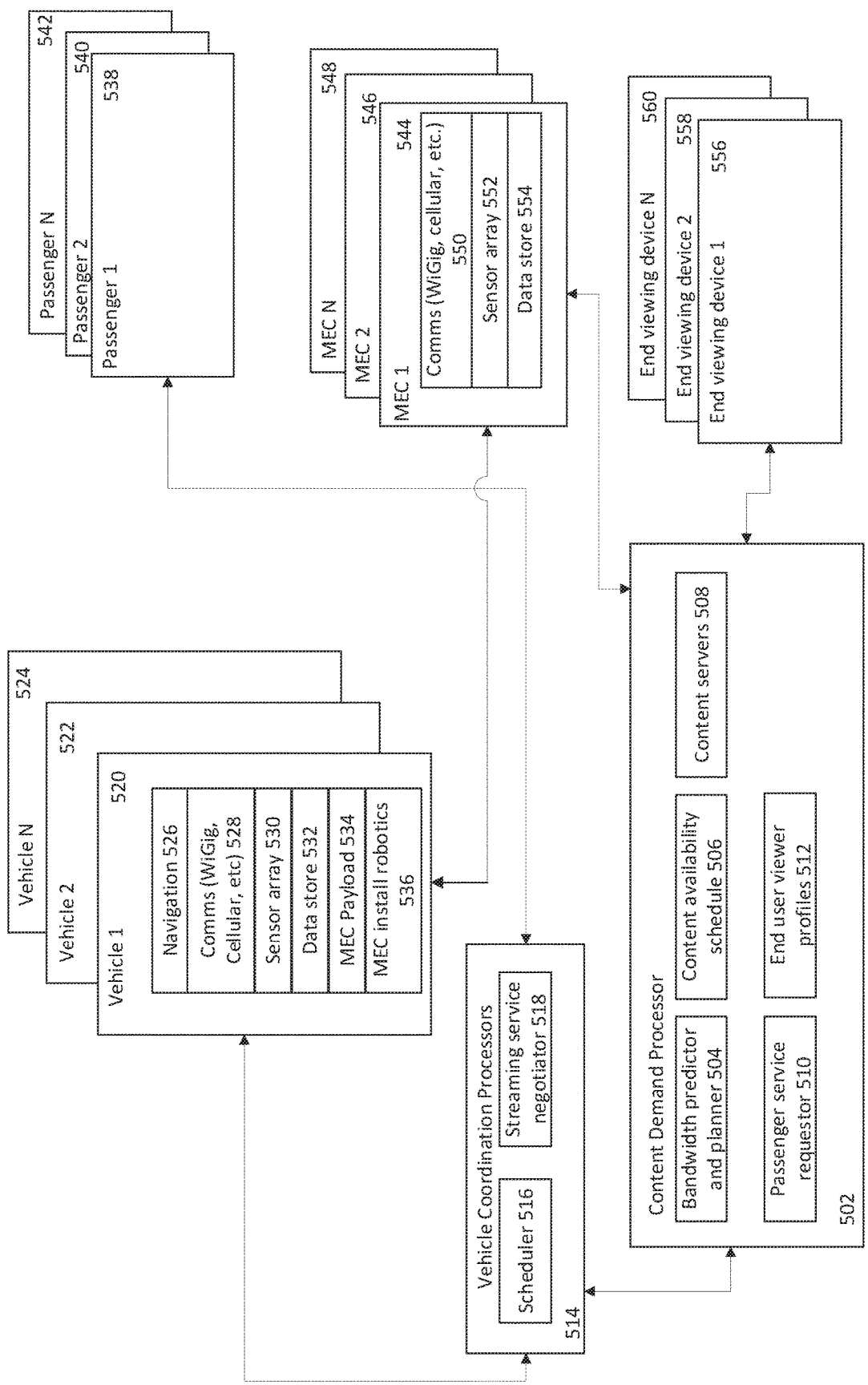
FIG. 5 shows various possible elements within a media content delivery system.

FIG. 5 shows a component system for media content delivery. In the system, one or more content demand processors 502 are used at least for identifying a need for content delivery. The one or more content demand processors 502 may comprise any of a bandwidth predictor and planner 504, a content availability scheduler 506, one or more content servers 508 a passenger service requester 510, and one or more end-user viewer profiles 512, or any combination thereof. The bandwidth predictor and planner 504 may analyze any data received regarding media content or bandwidth use to assess the need for delivery of media content. Content availability schedule 506 may comprise at least data related to the release or availability of media content. This may include, for example, release dates of media content, and/or access data for media content. The content servers 508 may comprise one or more servers to store media content or to wirelessly deliver or grant access to media content. The passenger service requester 510 may include a circuit to request passenger assent or permission for media content delivery. The end-user viewer profiles 512 may comprise one or more profiles for end-users including, but not limited to, any of user personal data, historic user viewing, future planned user viewing, anticipated user viewing, user requests for viewing, user bandwidth availability, or otherwise.

Where the one or more content demand processors 502 determines a need for media content delivery, the one or more content demand processors 502 coordinates with the one or more vehicle coordination processors 514 to arrange for vehicle delivery of the media data. The one or more vehicle coordination processors may comprise a scheduler 516 and/or a streaming service negotiator 518. The scheduler 516 may house, maintain, and/or evaluate at least one of a vehicle schedule or passenger schedule for evaluation of vehicle availability, passenger routes, passenger needs, or otherwise. The streaming service negotiator 518 may evaluate recompense from the streaming service, to determine whether there is an appropriate passenger with a schedule and/or destination to accommodate a request from the streaming service. The passenger service may receive a higher-level request to distribute content to a number of locations within a period of time. The passenger service may then include passenger pickups during data delivery for passengers who opt in for a ride at reduced cost in exchange for providing the service.

The vehicle may be a single vehicle or a vehicle within one or more fleets of vehicles. For demonstrative purposes, the vehicles are depicted as vehicle 1 520, vehicle 2 522, and ranging to vehicle N 524. The vehicles may be equipped for media content delivery by including one or more of the following: a navigation circuit 524, one or more communications circuits (such as WiGig, 5G, Cellular Communication, etc.) 528, one or more sensor arrays 530, one or more memories or devices for data storage 532, an MEC payload 534, and one or more MEC installation robotics 536. The navigation circuit 526 may be any circuit configured to determine location and/or provide directions to a point of destination and may use any known positional system including, but not limited to, Global Positioning System ("GPS"). The communication circuits 528 may be any circuits configured to communicate wirelessly and may use any wireless communication technology. The sensor array 530 may include one or more sensors configured to provide information about the vehicle or its location including, but not limited to, cameras, radar, sonar, lidar, accelerometer, or otherwise. The data store 532 may be any memory to store data. The MEC payload 534 may include at least a memory to store media content data. The MEC install robotics 536 may include any mechanical robotic device to transmit and MEC between a location in the vehicle.

The selected vehicle is selected at least for delivery of media content. The selected vehicle may be engaged in passenger transportation, whether before, during, or after media content delivery. The selected vehicle may carry one or more passengers, each passenger having points of origin or points of departure the same or different from other passengers.

The vehicle may be selected while transporting one or more passengers, or one or more passengers may be scheduled to enter the vehicle for transport during a media content delivery. The passengers herein are depicted as passenger 1 538, passenger 2 540, and ranging to passenger N 542. The passenger and passenger transportation is coordinated at least by the vehicle coordination processor 514.

The vehicle may be equipped with a device to receive and store media content. According to one aspect of the disclosure, the device to receive and store media content may be known as an MEC device. For demonstrative purposes, FIG. 5 depicts a first MEC device 544, a second MEC device 546, and ranging to the Nth MEC device 548. The MEC device may comprise any of a communication module (such as communication for WiGig, 5G, cellular communication, or otherwise) 550, a sensor array 552, and/or a data storage module 554. An MEC module, such as MEC 1 544, may correspond to a particular vehicle, such as the depicted relationship between MEC 1 544 and vehicle 1 520. The MEC may be installed on or in the vehicle, such that locomotion of the vehicle results in locomotion of the MEC. The MEC may be permanently mounted to the vehicle or be detachable.

As described herein, the one or more content demand processors 502 determines a need for additional media content or hardware and causes the one or more vehicle coordination processors 514 to identify a vehicle to receive and deliver the media content. The vehicle will travel to a first location to receive a wireless transmission of the media content, and the vehicle will travel to a second location to deliver the media content. The media content may be delivered wirelessly to a station, base station, and user device, or otherwise located at or near the second location. Alternatively, the media content may be stored within an MEC, which is transported by the vehicle, and the MEC may be removed from the vehicle and left at or near the second location for further use and/or delivery of the corresponding media content.

Once the media content is delivered, it becomes available for an end viewing device. Multiple end viewing devices may be connected or be granted access to media content stored within the MEC, as is depicted by the end viewing device 1 556, the end viewing device 2 558, and the end viewing device N 560. Access to stored media content may be granted to one or more end viewing devices by the content demand processor 502. The content demand processor 502 may take into consideration any planned, anticipated, or requested access to media content as initiated by one or more end viewing devices, in determining a delivery of media content.

FIG. 6 shows a user acceptance module 600 for a modified route. According to one aspect of the disclosure, a user, such as a passenger in a vehicle selected for media content delivery, may consent to, or reject, the vehicle's use for media content delivery. This may be due at least to a prospective change in the route or any delay that may ensue from data content transmission. For example, it may be necessary to modify a passenger route from a shortest or fastest route between the point of origin and a point of destination, such that the vehicle is caused to travel within a vicinity of the first location and the second location, whereby the vehicle receives the media content at the first location and delivers the media content at the second location. The user acceptance module 600 may be provided to a user on a user device or a vehicle-mounted device, or otherwise. According to one aspect of the disclosure, the user acceptance module 600 may appear on a screen 602, such as on a smart phone, tablet computer, or other touch-screen device. The user may be given a notification of the prospective route change, as well as a notification of a prospective change in length or duration of the route 604. The user may be provided with a depiction of an original route 608 and a depiction of the modified route 610, whereby the original route 608 is selected for its minimal distance or duration, and whereby the modified route 610 is selected for its proximity to the first location and/or the second location. In light of this information, the user may be given an opportunity to consent to the route modification, or to reject the route modification, such as by using a button for consent 612 or a button for rejection 614. The user may be offered incentives (not shown in this figure) for consenting to a modified route, such as price reduction, credit for future rides, access to media content, or otherwise.

FIG. 7 shows a media content delivery device 700, said device comprising one or more content demand processors 702, configured to determine a first location, the first location being a location for media content receipt; determine a second location, the second being a location for media content delivery; and one or more vehicle coordination processors 704, configured to select a vehicle for media content transportation; cause the vehicle to wirelessly receive the media content at the first location; and cause the vehicle to deliver the media content at the second location.

FIG. 8 shows a media content delivery system 800, comprising one or more content demand processors 802, configured to determine a first location, the first location being a location for media content receipt; and determine a second location, the second location being a location for media content delivery; a vehicle 804, configured to travel to a first location to wirelessly receive the media content; and travel to the second location to deliver the wirelessly received media content; a media content transfer device 806, located at the first location, configured to wirelessly transmit the media content to the vehicle; and one or more vehicle coordination processors, configured to select a vehicle for media content transportation; cause the vehicle to wirelessly receive the media content at the first location; and cause the vehicle to deliver the media content at the second location.

Figure 9:
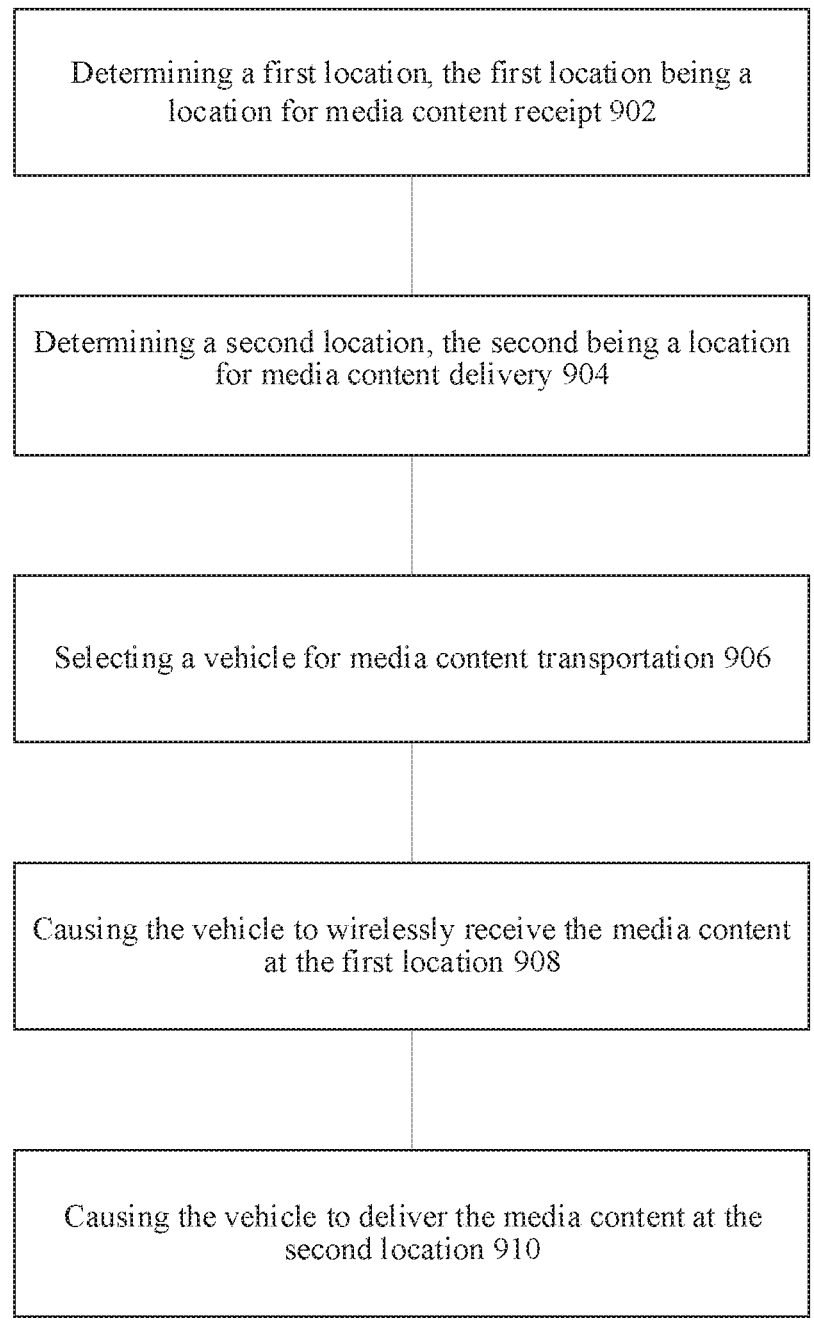
FIG. 9 shows a first method for media content delivery.

FIG. 9 shows a method of media content delivery 900, comprising determining a first location, the first location being a location for media content receipt 902; determining a second location, the second being a location for media content delivery 904; selecting a vehicle for media content transportation 906; causing the vehicle to wirelessly receive the media content at the first location 908; and causing the vehicle to deliver the media content at the second location 910.

Figure 10:
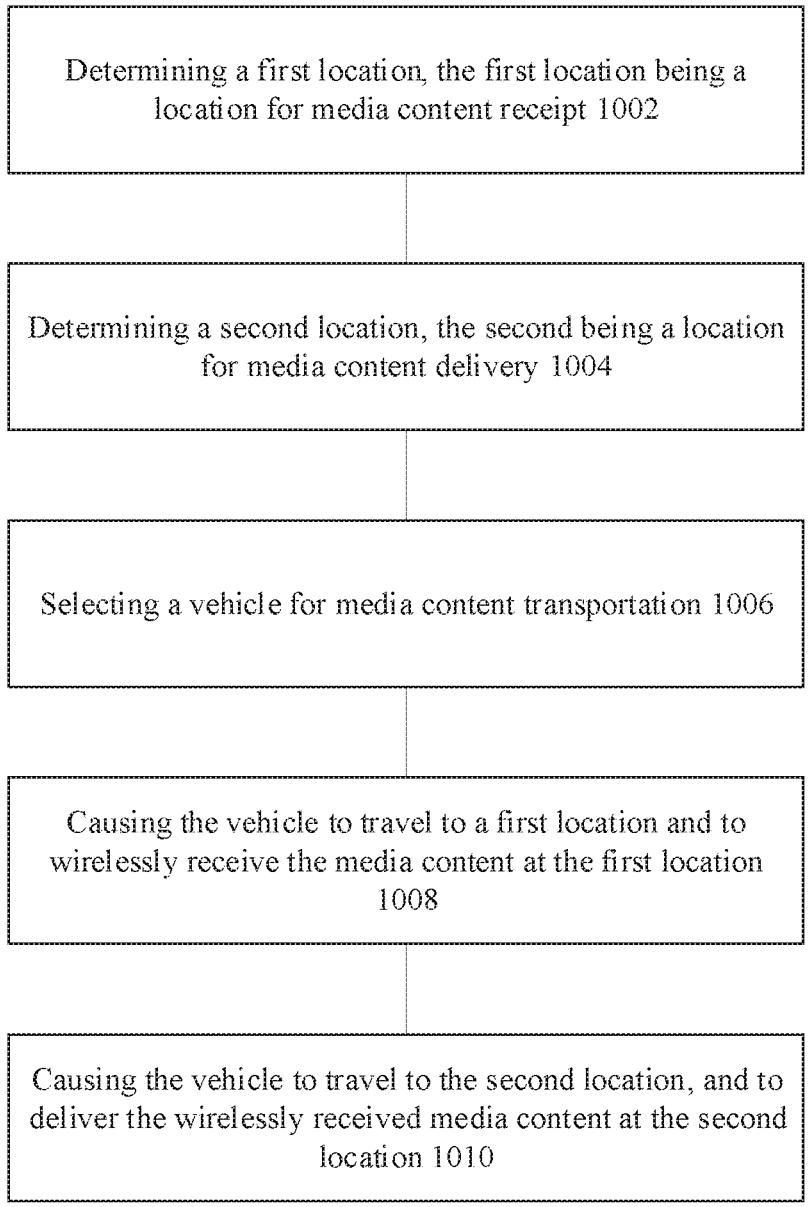
FIG. 10 shows a second method for media content delivery.

FIG. 10 shows a method of media content delivery 1000, comprising determining a first location, the first location being a location for media content receipt 1002; determining a second location, the second being a location for media content delivery 1004; selecting a vehicle for media content transportation 1006; causing the vehicle to travel to a first location and to wirelessly receive the media content at the first location 1008; and causing the vehicle to travel to the second location, and to deliver the wirelessly received media content at the second location 1010.

According to one aspect of the disclosure, a media content delivery device is disclosed, said device comprising one or more content demand processors, configured to determine a first location, the first location being a location for media content receipt; determine a second location, the second being a location for media content delivery; one or more vehicle coordination processors, configured to select a vehicle for media content transportation; cause the vehicle to wirelessly receive the media content at the first location; and cause the vehicle to deliver the media content at the second location.

According to another aspect of the disclosure, a media content delivery system is disclosed, said system comprising one or more content demand processors, configured to determine a first location, the first location being a location for media content receipt; and determine a second location, the second being a location for media content delivery; a vehicle, configured to travel to a first location to wirelessly receive the media content; and travel to the second location to deliver the wirelessly received media content; a media content transfer device, located at the first location, configured to wirelessly transmit the media content to the vehicle; and one or more vehicle coordination processors, configured to select a vehicle for media content transportation; cause the vehicle to wirelessly receive the media content at the first location; and cause the vehicle to deliver the media content at the second location.

Regarding the first location, the first location is a location at or in the vicinity of a media content distribution node. Said media content distribution node may be, without limitation, an MEC, a base station, or any other device capable of transmitting media content to the vehicle and/or to an MEC device located on or within the vehicle. According to one aspect of the disclosure, the first location may be an area of high vehicle traffic. The first location may be chosen due at least because of a simplicity of multiple vehicles traveling within a vicinity of the first location, such that the vehicles may download media content. Such potential high-traffic locations for a first location include, but are not limited to, airports, train stations, highways, thoroughfares, public squares, taxi stands, parking lots, or any other location capable of permitting a vehicle to arrive within a proximity of a media content distribution node.

The media content distribution node may be configured to wirelessly transfer media content from the content distribution node to the vehicle. This wireless transfer may take place using any wireless communication protocol including, but not limited to, any known RAT, including, but not limited to, Long Term Evolution (LTE), 5G Technology, WiGig, WiFi, WLAN, or otherwise. The wireless transfer may be performed during a period when the vehicle is stopped, such as at a taxi stand or a stoplight. Alternatively, the wireless transfer may be configured to be performed while the vehicle is moving, such as during a period of time that the vehicle travels through a vicinity of the first location or the second location.

The vehicle content distribution mode may be configured to wirelessly transfer data to the vehicle. This may be performed where the vehicle is stopped, such as at a taxi stand or parking spot, and the vehicle is wirelessly connected to the media content distribution mode for a transfer of media content.

A media content delivery system may utilize one or more media content distribution nodes, such that one of a plurality of media content distribution nodes may be selected as the mode for media content transfer to the vehicle. It is anticipated that a region or municipality may have a plurality of media content distribution nodes at various locations. Where this occurs, the media content distribution node that is selected for transfer of media content to the vehicle becomes the relevant media content distribution node within the plurality, and the location of said media content distribution node is designated as the first location.

Where a plurality of media content distribution nodes are available, one of the plurality of media content distribution nodes may be selected due to its proximity to a vehicle or a vehicle route. It is anticipated that, at the time a media content transfer request is initiated, a vehicle may be in route with a passenger or may soon be in route with a passenger. Various taxi, transportation, or ridesharing services offer rides based on a point of origin and a point of destination. Using this information, it is known to create a route to deliver a passenger from the point of origin to the point of destination. As described herein, a first location and corresponding media content distribution node may be selected based on a proximity to the vehicle's route. That is, a vehicle on an assigned route between a point of origin and point of destination may travel within a closer proximity to one media content distribution node compared to remaining media content distribution nodes, and said media content distribution node may be selected based on its proximity to the vehicle route.

The second location may be selected based on the one or more content demand processors' calculation of any of the following: a need for additional media content, a need for additional hardware, a lack of sufficient bandwidth, an anticipated media content or bandwidth demand, or any combination of the foregoing. The second location may correspond with an MEC or other device capable of receiving and storing a transmission of media content. The evaluation of the available bandwidth for media content may comprise at least one of identifying an inadequate available bandwidth for an anticipated media content demand; evaluation of past bandwidth use corresponding to a vicinity of the second location; evaluation of streaming data consumption corresponding to a vicinity of the second location; an anticipated release of content data; and any of the foregoing. The second location may be identified by at least one of analysis of historical data, such as data related to previous streaming content; previous bandwidth sufficiency; previous user satisfaction levels; previous releases of media content; and any combination of the foregoing.

According to one aspect of the disclosure, the second location may, but need not be, on the edge of an existing network. The problem of insufficient bandwidth may be exacerbated by being physically located at or near the edge of an existing network, and devices at such a location may experience increased difficulty in receiving media content. As such, and MEC or other device for receiving media content from the vehicle may be used to supplement the bandwidth and transmission technologies available to devices located at the network edge.

Upon reaching the second location, the vehicle may wirelessly deliver media content to a mobile edge station or other device at or in the vicinity of the second location. That is, the vehicle receives the media content and/or in the vicinity of the first location and delivers the media content to an MEC or device at or in the vicinity of the second location. Upon being transmitted to and MEC or device at or in the vicinity of the second location, the media content is stored on the MEC or device and made available for end users. An end user wishing to access said stored media content may receive the media content from the MEC or other device. Alternatively, the user wishing to access the stored media content may cause the stored media content to be transmitted from the MEC or the device to a user device. The user may view or otherwise access the stored media content as streaming data or as playing of stored data.

Alternatively, rather than the media content being wirelessly transmitted from the vehicle to a station at the second location, and MEC comprising the media content may be delivered from the vehicle to the second location. In this case, the vehicle may be equipped with an MEC that is removable or detachable, and the MEC may be detached or removed from the vehicle and left within a vicinity of the second location. The movement of the MEC from the vehicle to the second location may be performed by any method capable of moving the device. According to one aspect of the disclosure, the vehicle may be equipped with a robotic arm or other robotic feature capable of mechanically moving the MEC from the vehicle to a vicinity of the second location. Once detached from the vehicle and moved into the vicinity of the second location, the MEC may be left or abandoned in the area, during which time the vehicle leaves the second location and proceeds to one or more other locations. The MEC may be permanently or temporarily left at the second location. The MEC may be scheduled for pickup at a later date and may be used again for receipt of media content and delivery to an additional location. Once left at the second location, the MEC may be secured to prevent tampering or theft. Any method of securing may be used. According to one aspect of the disclosure the robotic arm or device on the vehicle, as described above, may be further configured to secure the MEC upon delivery to the second location.

According to another aspect of the disclosure, the media content transfer may be performed by a plurality of vehicles. Under this circumstance, a first vehicle receives a transfer of media content at the first location, and the first vehicle travels to the second location for delivery of the received media content. Simultaneously or subsequently, a second vehicle receives additional or otherwise different media content and travels to the second location to deliver the additional or otherwise different media content. In this way, the second location receives media content from a plurality of sources. The media content received from the plurality of sources may be related media content, such as data portions of a singular program, video, or otherwise, or the successive transmissions of media content may be for differing media content, such as, for example, a first video and a second video, or a first video and a first program. Similarly, a singular vehicle may return multiple times to the second location to deliver media content. In this manner, the vehicle received media content from the first location and delivers the media content at the second location. The vehicle subsequently receives additional media content at the first or another location and delivers the additional media content to the second location.

The vehicle may be selected from one or more ridesharing or transportation services. With respect to ridesharing services, several options currently exist for users to be matched with one of a fleet of vehicles to transfer a user from a point of origin to a point of destination. These services may be known as ridesharing services, in the sense that a plurality of otherwise unrelated users may be matched to a single vehicle based on a similarity of origin, a similarity of destination, or a similarity of route between the origin and destination. Many such ridesharing services comprise a plurality of vehicles and engage one or more algorithms to select a vehicle within the plurality of vehicles for a given user, based on an origin of the user, a location of the vehicle, a destination of the user, or otherwise.

Where one or more users are matched to a vehicle for transportation between one or more points of origin and one or more destinations, the vehicle will be assigned a route. This route may bring the vehicle within a proximity of the first location and/or the second location. The vehicle may be chosen from a plurality of ridesharing vehicles based on a similarity of route to the first location or the second location. That is, where the user-route causes the vehicle to travel near the first location and/or the second location, the data transfer as described herein may be performed with minimal or no changes or interruption to the scheduled route.

It is also anticipated that a user-route may be modified to accommodate transmission at the first location and/or the second location. That is, where a user route planned based on user origin and destination does not bring the vehicle sufficiently close to the first location and/or the second location, the user route may be amended or modified to bring the vehicle to our near the first location and/or the second location. The user-route may be modified even despite the resulting route's length or duration being greater than that of the user-route. Where one of a plurality of vehicles is selected for delivery of media content, the vehicle may be selected at least in part based on a degree of route modification necessary to include sufficient proximity to the first location and/or the second location. That is, a route may be chosen because minimal modification is required to receive and/or deliver the media content.

It is anticipated that a user, in the vehicle or scheduled for transportation within the vehicle, may be permitted to accept or reject a proposed modification of the route. Because a route modification may increase either a duration or length of the route, and thus may have consequences regarding transportation cost or time, the user or user's within the vehicle may be given the opportunity to accept or decline a proposed route change. This acceptance or declining may be performed on a vehicle device or a user device. This acceptance or declining may be performed during or before a ride.

A passenger may be incentivized to consent to a route modification for media content delivery. Such incentives may include, without limitation, decreased fare, redeemable value for future rides, access to media content for download during a ride, access to the vehicle-delivered media content pursuant to the methods described herein at a passenger's home or business, or otherwise.

According to one aspect of the disclosure, the vehicle may be selected from one or more pools of vehicles in one or more ridesharing services. Ridesharing services may include at least services that match two or more passengers to a vehicle for transportation to one or more destinations. Ridesharing services may further include carpooling services. The system disclosed herein may be configured to simultaneously seek vehicles from a plurality of ridesharing systems. The system may be configured to select a modified route taking into account one or more points of origin and one or more destinations of a plurality of passengers.

According to another aspect of the disclosure, the vehicle may be selected from one or more pools of vehicles in one or more transportation services. Transportation services may include at least services that match a single passenger to a vehicle for transportation to a destination. Such services may further include taxi services, limousine services, or for-hire services that match a driver of a vehicle with the passenger.

The vehicle may further be selected from within a pool of one or more autonomous vehicles. It is anticipated that autonomous vehicles may be used to transport one or more passengers from a point of origin to a point of destination. The services offered by an autonomous vehicle may be substantially similar to services offered by a transportation service or a ridesharing service, such as the ability to request vehicle for transportation, transportation from a point of origin to a point of destination, and potentially the ability to share a vehicle with one or more additional passengers in exchange for a benefit, such as a reduced fare. An autonomous vehicle may be selected as a vehicle in the same way that a vehicle from a transportation service or a ridesharing service may be used.

A vehicle without a passenger may also be selected for media content transportation. In the context of transportation services or ridesharing services, vehicles and counter periods of low ridership where the vehicle remains without a passenger. Any such passenger less vehicle may be selected by the system to transport media content as described herein. Similarly, autonomous vehicles may be without a passenger and may be selected by the system, even where a passenger is not present, to perform media content transport. Because autonomous vehicles do not require a driver, such vehicles may be available twenty-four hours per day, or otherwise during off-peak times when drivers for manned-vehicles may not otherwise be available.

The one or more vehicle coordination processors of the system described herein may be configured to select the vehicle using at least one of the following: a passenger destination, a passenger departure location, a passenger route, a proximity between a location along the passenger route and a media content distribution node, a traffic pattern, and any combination of the foregoing.

The vehicle with a media content storage device, which may be detachable with respect to the vehicle, or built-in to the vehicle itself. The media content storage device may include a memory to store media content.

The media content may be any digital data without limitation. Such media content may include, but is not limited to, software, data backup files, website data, video files, audio files, movies, streaming video releases, and any combination thereof.

The vehicle may be further equipped with a robotic device for movement, attachment, detachment, and/or delivery of the media content storage device or MEC. The robotic device may be any device capable of moving the media content storage device or MEC from a point at the first location to the vehicle, or from the vehicle to a point at the second location. The robotic device may be capable of at least one of grasping, lifting, swinging, relocating, raising, lowering, shifting, fastening, securing, releasing, and any combination of the foregoing. The robotic device may be configured to secure the media content storage device or MEC at the second location. Such securing may be in the form of applying locks, locking security devices, initializing alarms or security devices, securing the device to a fixed structure to prevent removal, or otherwise.

The media content described herein may be provided to improve an end user viewing experience. The end user may select streaming content for viewing in a region where there is insufficient bandwidth to support the requested streaming content, thereby leading to an impaired viewing experience. The delivery of media content pursuant to the procedures described herein may improve the user's viewing experience by eliminating a need for the user to receive media content through a data connection with insufficient bandwidth.

It may occur that a user desires to access media content before media content transportation as described herein is completed. In such cases, a user's viewing experience of said media content may be limited by the available bandwidth. The user may be granted access to the media content using a conventional method, such as relying on the limited bandwidth as described herein. During the user's viewing of the media content, the media content may be delivered to the second location (ostensibly a location in a vicinity of the user), thereby potentially circumventing the need to rely on the limited bandwidth for receipt of the media content. Under these circumstances, and upon completion of the media content delivery as described herein, the user may continue to view the media content, but with improve quality, as allowed by the media content storage device or MEC. This may be described as the user viewing media content in a conventional manner at a first resolution, followed by the user viewing media content in a second manner using the media content storage device or MEC, said second manner providing media content at a second resolution. In this circumstance, the second resolution may be higher than the first resolution.

According to another aspect of the disclosure, the vehicle as described herein may be an unmanned aerial vehicle ("UAV"). The UAV may be selected from a fleet of one or more UAVs, and it may be selected based on its availability, its route being located in a vicinity of the first location and/or the second location, or otherwise. The methods and descriptions herein with respect to selecting a vehicle and delivering media content may be also applied to a UAV, without limitation.

According to another aspect of the disclosure, a vehicle participating in media content delivery may receive a vehicle credit. Said vehicle credit may be any benefit, whether a monetary payment or otherwise. A passenger agreeing to a route modification for media content delivery may receive an incentive as described herein, whether in the form of financial remuneration, benefits, access to data, or otherwise. The passenger incentive may be a portion of the vehicle credit, or the passenger incentive may be distinct from the vehicle credit.

In the following, various examples are provided with reference to the aspects described above.

In Example 1, a media content delivery device is disclosed, comprising one or more content demand processors, configured to determine a first location, the first location being a location for media content receipt; and determine a second location, the second being a location for media content delivery; and one or more vehicle coordination processors, configured to select a vehicle for media content transportation; cause the vehicle to wirelessly receive the media content at the first location; and cause the vehicle to deliver the media content at the second location.

In Example 2, the media content delivery device of Example 1 is disclosed, wherein the first location is a location within a vicinity of a media content distribution node.

In Example 3, the media content delivery device of Example 2 is disclosed, wherein the media content distribution node is configured to wirelessly transfer media content from the media content distribution node to the vehicle.

In Example 4, the media content delivery device of Example 3 is disclosed, wherein the media content distribution node is configured to perform 5G transmission of media content to the vehicle.

In Example 5, the media content delivery device of Example 3 is disclosed, wherein the media content distribution node is configured to perform wireless transmission of media content to the vehicle pursuant to Wireless Gigabit Alliance 802.11ad.

In Example 6, the media content delivery device of any one of Examples 1 to 5 is disclosed, wherein the first location is distinct from the second location.

In Example 7, the media content delivery device of any one of Examples 1 to 6 is disclosed, wherein the first location is selected based at least on a proximity between the first location and a point within a route of the vehicle.

In Example 8, the media content delivery device of any of Examples 1 to 7 is disclosed, wherein the content demand circuit determines the second location by evaluating at least one of an available bandwidth for media content, an anticipated demand for media content, and a combination of any of the foregoing.

In Example 9, the media content delivery device of Example 8 is disclosed, wherein the evaluation of the available bandwidth for media content comprises at least one of identifying an inadequate available bandwidth for an anticipated media content demand; evaluation of past bandwidth use corresponding to a vicinity of the second location; evaluation of streaming data consumption corresponding to a vicinity of the second location; an anticipated release of content data; and any of the foregoing.

In Example 10, the media content delivery device of any of Examples 1 to 8 is disclosed, wherein the content demand circuit determines the second location by evaluating data of prior bandwidth capacity at the second location.

In Example 11, the media content delivery device of any of Examples 1 to 10 is disclosed, wherein the vehicle wirelessly delivers the media content at the second location to a mobile edge station.

In Example 12, the media content delivery device of any of Examples 1 to 11 is disclosed, wherein the vehicle comprises a mobile edge station; the media content is delivered to the vehicle's mobile edge station at the first location, and the vehicle delivers the mobile edge station to the second location.

In Example 13, the media content delivery device of Example 12 is disclosed, wherein the vehicle leaves the delivered mobile edge station at the second location.

In Example 14, the media content delivery device of any of Examples 1 to 13 is disclosed, wherein the one or more vehicle coordination processors cause one or more vehicles to return to the second location for additional data transfer.

In Example 15, the media content delivery device of any of Examples 1 to 14 is disclosed, wherein at least two vehicles transfer data to the second location.

In Example 16, the media content delivery device of any of Examples 1 to 15 is disclosed, wherein the one or more vehicle coordination processors are further configured to select the vehicle from one or more vehicles in one or more ride-sharing services.

In Example 17, the media content delivery device of any of Examples 1 to 15 is disclosed, wherein the one or more vehicle coordination processors are further configured to select the vehicle from one or more vehicles in one or more transportation services.

In Example 18, the media content delivery device of any of Examples 1 to 15 is disclosed, wherein the one or more vehicle coordination processors are further configured to select the vehicle from one or more autonomous vehicles.

In Example 19, the media content delivery device of any of Examples 16 to 18 is disclosed, wherein the one or more vehicle coordination processors are further configured to select the vehicle using at least one of the following: a passenger destination, a passenger departure location, a passenger route, a proximity between a location along the passenger route and a media content distribution node, a traffic pattern, and any combination of the foregoing.

In Example 20, the media content delivery device of any of Examples 1 to 19 is disclosed, wherein one or more riders in the selected vehicle may assent to or reject the selection of the vehicle.

In Example 21, the media content delivery device of any of Examples 1 to 20 is disclosed, wherein the selected vehicle is an autonomous vehicle without a passenger.

In Example 22, the media content delivery device of any of Examples 1 to 21 is disclosed, wherein the vehicle is selected based at least on a proximity between a point within a route of the vehicle and the first location.

In Example 23, the media content delivery device of any of Examples 1 to 22 is disclosed, wherein the vehicle comprises a memory to store the received media content.

In Example 24, the media content delivery device of any of Examples 1 to 23 is disclosed, wherein the media content comprises streaming media content.

In Example 25, the media content delivery device of any of Examples 1 to 23 is disclosed, wherein the media content comprises software.

In Example 26, the media content delivery device of any of Examples 1 to 23 is disclosed, wherein the media content comprises a consumer data backup.

In Example 27, the media content delivery device of any of Examples 1 to 26 is disclosed, wherein the vehicle further comprises a robotic device, configured to mechanically move an equipment comprising the received media content from the vehicle to a vicinity of the first location.

In Example 28, the media content delivery device of Example 27 is disclosed, wherein the robotic device is further configured to secure the equipment comprising the stored media content.

In Example 29, the media content delivery device of any of Examples 1 to 28 is disclosed, further comprising modifying an established vehicle route to include the first location and the second location.

In Example 30, the media content delivery device of Example 29 is disclosed, wherein the modified route is longer than the established route.

In Example 31, the media content delivery device of Example 29 or 30 is disclosed, wherein the modified route is anticipated to require more time than the established route.

In Example 32, the media content delivery device of any of Examples 1 to 31 is disclosed, wherein the one or more content demand processors are further configured to request passenger approval for the modified route.

In Example 33, the media content delivery device of any of Examples 1 to 32 is disclosed, wherein a passenger receives the media content during the modified route.

In Example 34, the media content delivery device of any of Examples 1 to 33 is disclosed, wherein an end user of the media content receives data at a first resolution before vehicle delivery of the media content and receives data at a second resolution after delivers of the media content.

In Example 35, the media content delivery device of Example 34 is disclosed, wherein the second resolution is a higher resolution than the first resolution.

In Example 36, the media content delivery device of any of Examples 1 to 35 is disclosed, wherein the vehicle is an unmanned aerial vehicle.

In Example 37, a media content delivery system is disclosed, comprising one or more content demand processors, configured to determine a first location, the first location being a location for media content receipt; and determine a second location, the second being a location for media content delivery; a vehicle, comprising a media content transportation device, configured to travel to a first location to wirelessly receive the media content via the media content transport device; and travel to the second location to deliver the received media content; one or more vehicle coordination processors, configured to select a vehicle for media content transportation; cause the vehicle to wirelessly receive the media content at the first location; and cause the vehicle to deliver the media content at the second location.

In Example 38, the media content delivery system of Example 37 is disclosed, wherein the first location is a location within a vicinity of a media content distribution node.

In Example 39, the media content delivery system of Example 38 is disclosed, wherein the media content distribution node is configured to wirelessly transfer media content from the media content distribution node to the vehicle.

In Example 40, the media content delivery system of Example 39 is disclosed, wherein the media content distribution node is configured to perform 5G transmission of media content to the vehicle.

In Example 41, the media content delivery system of Example 39 is disclosed, wherein the media content distribution node is configured to perform wireless transmission of media content to the vehicle pursuant to Wireless Gigabit Alliance 802.11ad.

In Example 42, the media content delivery system of any one of Examples 37 to 41 is disclosed, wherein the first location is distinct from the second location.

In Example 43, the media content delivery system of any one of Examples 37 to 42 is disclosed, wherein the first location is selected based at least on a proximity between the first location and a point within a route of the vehicle.

In Example 44, the media content delivery system of any of Examples 37 to 43 is disclosed, wherein the content demand circuit determines the second location by evaluating at least one of an available bandwidth for media content, an anticipated demand for media content, and a combination of any of the foregoing.

In Example 45, the media content delivery system of Example 44 is disclosed, wherein the evaluation of the available bandwidth for media content comprises at least one of identifying an inadequate available bandwidth for an anticipated media content demand; evaluation of past bandwidth use corresponding to a vicinity of the second location; evaluation of streaming data consumption corresponding to a vicinity of the second location; an anticipated release of content data; and any of the foregoing.

In Example 46, the media content delivery system of any of Examples 37 to 44 is disclosed, wherein the content demand circuit determines the second location by evaluating data of prior bandwidth capacity at the second location.

In Example 47, the media content delivery system of any of Examples 37 to 46 is disclosed, wherein the vehicle wirelessly delivers the media content at the second location to a mobile edge station.

In Example 48, the media content delivery system of any of Examples 37 to 47 is disclosed, wherein the vehicle comprises a mobile edge station; the media content is delivered to the vehicle's mobile edge station at the first location, and the vehicle delivers the mobile edge station to the second location.

In Example 49, the media content delivery system of Example 48 is disclosed, wherein the vehicle leaves the delivered mobile edge station at the second location.

In Example 50, the media content delivery system of any of Examples 37 to 49 is disclosed, wherein the one or more vehicle coordination processors cause one or more vehicles to return to the second location for additional data transfer.

In Example 51, the media content delivery system of any of Examples 37 to 50 is disclosed, wherein at least two vehicles transfer data to the second location.

In Example 52, the media content delivery system of any of Examples 37 to 51 is disclosed, wherein the one or more vehicle coordination processors are further configured to select the vehicle from one or more vehicles in one or more ride-sharing services.

In Example 53, the media content delivery system of any of Examples 37 to 51 is disclosed, wherein the one or more vehicle coordination processors are further configured to select the vehicle from one or more vehicles in one or more transportation services.

In Example 54, the media content delivery system of any of Examples 37 to 51 is disclosed, wherein the one or more vehicle coordination processors are further configured to select the vehicle from one or more autonomous vehicles.

In Example 55, the media content delivery system of any of Examples 52 to 54 is disclosed, wherein the one or more vehicle coordination processors are further configured to select the vehicle using at least one of the following: a passenger destination, a passenger departure location, a passenger route, a proximity between a location along the passenger route and a media content distribution node, a traffic pattern, and any combination of the foregoing.

In Example 56, the media content delivery system of any of Examples 37 to 55 is disclosed, wherein one or more riders in the selected vehicle may assent to or reject the selection of the vehicle.

In Example 57, the media content delivery system of any of Examples 37 to 56 is disclosed, wherein the selected vehicle is an autonomous vehicle without a passenger.

In Example 58, the media content delivery system of any of Examples 37 to 57 is disclosed, wherein the vehicle is selected based at least on a proximity between a point within a route of the vehicle and the first location.

In Example 59, the media content delivery system of any of Examples 37 to 58 is disclosed, wherein the vehicle comprises a memory to store the received media content.

In Example 60, the media content delivery system of any of Examples 37 to 59 is disclosed, wherein the media content comprises streaming media content.

In Example 61, the media content delivery system of any of Examples 37 to 59 is disclosed, wherein the media content comprises software.

In Example 62, the media content delivery system of any of Examples 37 to 59 is disclosed, wherein the media content comprises a consumer data backup.

In Example 63, the media content delivery system of any of Examples 37 to 62 is disclosed, wherein the vehicle further comprises a robotic device, configured to mechanically move an equipment comprising the received media content from the vehicle to a vicinity of the first location.

In Example 64, the media content delivery system of Example 63 is disclosed, wherein the robotic device is further configured to secure the equipment comprising the stored media content.

In Example 65, the media content delivery system of any of Examples 37 to 64 is disclosed, further comprising modifying an established vehicle route to include the first location and the second location.

In Example 66, the media content delivery system of Example 65 is disclosed, wherein the modified route is longer than the established route.

In Example 67, the media content delivery system of Example 65 or 66 is disclosed, wherein the modified route is anticipated to require more time than the established route.

In Example 68, the media content delivery system of any of Examples 37 to 67 is disclosed, wherein the one or more content demand processors are further configured to request passenger approval for the modified route.

In Example 69, the media content delivery system of any of Examples 37 to 68 is disclosed, wherein a passenger receives the media content during the modified route.

In Example 70, the media content delivery system of any of Examples 37 to 69 is disclosed, wherein an end user of the media content receives data at a first resolution before vehicle delivery of the media content and receives data at a second resolution after delivers of the media content.

In Example 71, the media content delivery system of Example 70 is disclosed, wherein the second resolution is a higher resolution than the first resolution.

In Example 72, the media content delivery system of any of Examples 37 to 71 is disclosed, wherein the vehicle is an unmanned aerial vehicle.

In Example 73, the media content delivery system of any one of Examples 37 to 72 is disclosed, wherein the media content transportation device is a mobile edge computing device.

In Example 74, a media content delivery system is disclosed, comprising one or more first media content nodes; one or more content demand processors, configured to determine a first location, the first location being a location for media content receipt and corresponding to one of the one or more first media content nodes; and determine a second location, the second location being a location for media content delivery; one or more vehicles comprising a media content delivery device, said one or more vehicles being configured to travel to the first location to wirelessly receive the media content from the first media content node to the media content delivery device and travel to the second location to deliver the received media content; and one or more vehicle coordination processors, configured to select a vehicle of the one or more vehicles for media content transportation; cause the vehicle to wirelessly receive the media content at the first location via the media content delivery device; and cause the vehicle to deliver the media content at the second location.

In Example 75, a method of media content delivery is disclosed, comprising determining a first location, the first location being a location for media content receipt; determining a second location, the second being a location for media content delivery; selecting a vehicle for media content transportation; causing the vehicle to wirelessly receive the media content at the first location; and causing the vehicle to deliver the media content at the second location.

In Example 76, a method of media content delivery is disclosed, comprising determining a first location, the first location being a location for media content receipt; determining a second location, the second being a location for media content delivery; selecting a vehicle for media content transportation; causing the vehicle to travel to a first location and to wirelessly receive the media content at the first location; and causing the vehicle to travel to the second location, and to deliver the wirelessly received media content at the second location.

In Example 77, the media content delivery device of any one of Examples 1 to 36 is disclosed, wherein the media content distribution node is configured to perform wireless transmission of media content to the vehicle pursuant to Wireless Gigabit Alliance 802.11.

In Example 78, the media content delivery device of any one of Examples 1 to 36 is disclosed, wherein the media content distribution node is configured to perform wireless transmission of media content to the vehicle pursuant to Wireless Gigabit Alliance 802.11.

In Example 78, a non-transient computer readable medium containing program instructions to cause one or more processors to carry out any method in Examples 75 or 76 is disclosed.

In Example 79, a means for media content delivery is disclosed, comprising one or more content demand processing means, configured to determine a first location, the first location being a location for media content receipt; and determine a second location, the second being a location for media content delivery; and one or more vehicle coordination processing means, configured to select a vehicle for media content transportation; cause the vehicle to wirelessly receive the media content at the first location; and cause the vehicle to deliver the media content at the second location.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A media content delivery device, comprising:
one or more content demand processors, configured to
receive route data representing a route of each of a plurality of vehicles;
determine a first location, the first location being a location for media content receipt; and
determine a second location, the second being a location for media content delivery; and
one or more vehicle coordination processors, configured to
select a vehicle for media content transportation, based at least on the received route data and a proximity between the first location and a first portion of a route of the selected vehicle and a proximity between the second location and a second portion of the route of the selected vehicle;
determine a modified route of the selected vehicle, wherein the modified route comprises a closer proximity to the first location or the second location then the route of the selected vehicle as received in the route data; and
generate a message for the selected vehicle representing the modified route;
wherein the one or more content demand processors are further configured to request passenger approval for the modified route; and wherein the one or more vehicle coordination processors are further configured to receive data representing passenger approval of the modified route in response to the request for passenger approval for the modified route.

2. The media content delivery device of claim 1, wherein the first location is a location within a vicinity of a media content distribution node.

3. The media content delivery device of claim 1, wherein the first location is selected based at least on a proximity between the first location and a point within a route of the vehicle.

4. The media content delivery device of claim 1, wherein the one or more content demand processors determine the second location by evaluating at least one of an available bandwidth for media content, an anticipated demand for media content, and a combination of any of the foregoing.

5. The media content delivery device of claim 4, wherein the evaluation of the available bandwidth for media content comprises at least one of identifying an inadequate available bandwidth for an anticipated media content demand; evaluation of past bandwidth use corresponding to a vicinity of the second location; evaluation of streaming data consumption corresponding to a vicinity of the second location; an anticipated release of content data; and any of the foregoing.

6. The media content delivery device of claim 1, wherein the vehicle wirelessly delivers the media content at the second location to a mobile edge station.

7. The media content delivery device of claim 1, wherein the vehicle comprises a mobile edge station; the media content is delivered to the vehicle's mobile edge station at the first location; and the vehicle deposits the mobile edge station at the second location.

8. The media content delivery device of claim 1, wherein the one or more vehicle coordination processors are further configured to select the vehicle from one or more vehicles in one or more ride-sharing services.

9. The media content delivery device of claim 8, wherein the one or more vehicle coordination processors are further configured to select the vehicle using at least one of the following: a passenger destination, a passenger departure location, a passenger route, a proximity between a location along the passenger route and a media content distribution node, a traffic pattern, and any combination of the foregoing.

10. The media content delivery device of claim 1, wherein the media content comprises streaming media content.

11. The media content delivery device of claim 1, wherein the media content comprises software.

12. The media content delivery device of any claim 1, wherein the media content comprises a consumer data backup.

13. The media content delivery device of claim 1, further comprising modifying an established vehicle route to include the first location and the second location.

14. A media content delivery system, comprising:
one or more first media content nodes;
one or more content demand processors, configured to
determine a first location, the first location being a location for media content receipt and corresponding to one of the one or more first media content nodes;
determine a second location, the second location being a location for media content delivery;
one or more vehicles comprising a media content delivery device, said one or more vehicles being configured to travel to the first location to wirelessly receive the media content from the first media content node to the media content delivery device and travel to the second location to deliver the received media content; and to reply to a message representing a modified route with an approval or a rejection of the modified route based on passenger input; and
one or more vehicle coordination processors, configured to
select a vehicle for media content transportation, based at least on the received route data and a proximity between the first location and a first portion of a route of the selected vehicle and a proximity between the second location and a second portion of the route of the selected vehicle;
determine the modified route of the selected vehicle, wherein the modified route comprises a closer proximity to the first location or the second location then the route of the selected vehicle as received in the route data;
generate the message for the selected vehicle representing the modified route;
request passenger approval for the modified route; and
receive data representing passenger approval of the modified route in response to the request for passenger approval for the modified route.

15. The media content delivery system of claim 14, wherein
the first location is a location within a vicinity of a media content distribution node;
wherein the first location is selected based at least on a proximity between the first location and a point within a route of the vehicle; and wherein the second location is selected by evaluating data of prior bandwidth capacity at the second location.

16. A method of media content delivery, comprising:

receiving route data representing a route of each of a plurality of vehicles;

determining a first location, the first location being a location for media content receipt;

determining a second location, the second being a location for media content delivery;

selecting a vehicle for media content transportation based at least on the received route data;

determining a modified route for the selected vehicle wherein the modified route comprises a closer proximity to the first location or the second location then the route of the selected vehicle as received in the route data;

generating a message for the selected vehicle representing the modified route;

requesting passenger approval for the modified route; and receiving passenger approval of the modified route in response to the request for passenger approval for the modified route.

17. The method of media content delivery of claim 16, wherein the first location is a location within a vicinity of a media content distribution node; wherein the first location is selected based at least on a proximity between the first location and a point within a route of the vehicle; and wherein the second location is selected by evaluating data of prior bandwidth capacity at the second location.

* * * * *